United States Patent [19]
Yamada et al.

[11] Patent Number: 5,843,514
[45] Date of Patent: Dec. 1, 1998

[54] SEASONING MATERIAL

[75] Inventors: Norihiko Yamada; Yasuko Takada; Tsutomu Harada, all of Kawasaki, Japan

[73] Assignee: Ajinomoto Co., Inc., Tokyo, Japan

[21] Appl. No.: 747,974

[22] Filed: Nov. 12, 1996

Related U.S. Application Data

[63] Continuation of Ser. No. 196,223, filed as PCT/JP93/00983 Jul. 15, 1993 published as WO94/02034 Mar. 2, 1994, abandoned.

[30] Foreign Application Priority Data

Jul. 22, 1992 [JP] Japan .................................. 4-195523

[51] Int. Cl.⁶ .............................. A23J 1/00; A23L 1/221
[52] U.S. Cl. ........................ 426/650; 426/656; 426/442
[58] Field of Search .................................. 426/656, 650, 426/655, 495, 487, 442, 534

[56] References Cited

U.S. PATENT DOCUMENTS

| | | | |
|---|---|---|---|
| 3,881,022 | 4/1975 | Gasser | 426/656 |
| 4,180,591 | 12/1979 | Kazuo et al. | 426/589 |
| 4,587,127 | 5/1986 | Akao et al. | 426/62 |
| 4,741,914 | 5/1988 | Kimizuka et al. | 426/655 |
| 4,986,998 | 1/1991 | Yoo et al. | 426/650 |

FOREIGN PATENT DOCUMENTS

| | | |
|---|---|---|
| 0 249 863 | 12/1987 | European Pat. Off. . |
| 901975 | 8/1945 | France . |
| 2089624 | 1/1972 | France . |
| 2 309 636 | 11/1976 | France . |
| 60-27359 | 2/1985 | Japan . |
| 60-98960 | 6/1985 | Japan . |
| 2-150251 | 6/1990 | Japan . |
| 2 058 541 | 4/1981 | United Kingdom . |

*Primary Examiner*—Anthony J. Weier
*Attorney, Agent, or Firm*—Oblon, Spivak, McClelland, Maier & Neustadt, P.C.

[57] ABSTRACT

A novel seasoning material mainly composed of a turbid material obtained from an extract or liquid of livestock meat, fish or shellfish, vegetables, fungi or the like by reducing the ionic strength or electroconductivity thereof, when added to the prior art processed versions of natural extracts, natural extract substitutes, flavor-seasonings or to foods or drinks, can tone up their taste creating function or provide "steady and sharp" to the taste comparable to that of natural extracts or basic stocks.

20 Claims, No Drawings

SEASONING MATERIAL

This application is a Continuation of application Ser. No. 08/196,223, filed on Jun. 9, 1994, now abandoned, which was filed as International Application No. PCT/JP93/00983, on Jul. 15, 1993, published as WO94/02034, Mar. 2, 1994.

TECHNICAL FIELD

The present invention relates to a novel seasoning material principally composed of a salt-soluble high-molecular protein which is derived from an esculent animal, plant or fungus, can afford a feeling of "steady and sharp" or "consolidation" to the taste of foods and drinks when added thereto, and is tasteless per se, a novel seasoning containing said material, and foods and drinks whose taste has been enriched or consolidated by addition of said novel seasoning material or novel seasoning containing said material.

BACKGROUND ART

Natural extracts such as meat extracts, chicken extracts, fish and shellfish extracts, vegetable extracts, and the like, are popularly used as stock for various types of dishes. These natural extracts are used for the purpose of giving a complex taste and savor to foods, providing foods with "body" or "substance", or supplementing the taste of food materials.

However, since these natural extracts are expensive and difficult to procure, the processed versions of said natural extracts (such as processed beef extract, commercial consomme, commercial bouillon, and the like, in which said natural extracts are used only partially) and natural extract substitutes (such as protein hydrolyzates) are generally produced and marketed for common use. There are also available flavor-seasonings prepared by blending salt, sugar, umami-seasoning (flavor-enhancer), amino-acids and/or other pertinent substances with certain base stock material such as dried bonito, dried small sardines, stock kombu (sea tangle), dried shiitake (mushroom), and the like. However, since seasonings such as those processed versions of natural extracts, substitutes for natural extracts and flavor-seasonings are principally composed of low-molecular substances such as amino-acids, nucleotides, organic acids, and the like, with sodium glutamate being the main component, the foods and drinks spiced with these seasonings have some, problems or defects in that they are still simple in taste and rather flat to the palate when compared with those seasoned with natural extracts or base stocks.

In order to make up for such defects, it has been tried to improve taste by giving "body" or a complex savor to the seasonings such as mentioned above with the use of a hydrolyzate of vegetable protein (HVP), a hydrolyzate of animal protein (HAP), yeast extract or the like. However, due to the specific smell resultant from hydrolysis of HVP and HAP or the peculiar tang of yeast extract, there inevitably are restrictions on the amounts of such substances when blended in seasonings or foods and drinks, and the taste and flavor produced thereby are obviously stock, and can not be satisfactory accordingly. Especially, there is a distinct difference between them in savor represented by the words "steady and sharp" and "sourness with depth" which savor sets off or enrich the whole taste or gives consolidation and depth to the taste.

DISCLOSURE OF THE INVENTION

In view of the above, the present inventors has made strenuous studies for the purpose of enhancing the quality or seasoning potency of such processed versions of natural extracts, natural extract substitutes and flavor-seasonings and providing "steady and sharp" to the taste of seasoned foods and drinks. And as a result, they have found that a certain substance referred to as "turbid material" in this specification and comprising a salt-soluble high-molecular protein, i.e., insoluble high-molecular protein under low ionic strength, as the main component which is isolatable from, for example, a hot water extract of beef by using a dialysis membrane or the like is capable of enhancing the quality or seasoning potency of the prior art seasonings, i.e., the above-mentioned processed versions of natural extracts, natural extract substitutes and flavor-seasonings when said substance is added thereto, although said substance per se is tasteless, and that the foods and drinks seasoned with such prior art seasonings but enriched by this substance can be toned up in their savor as a whole and provided with "steady and sharp" and depth in taste. The present invention has been made on the basis of these findings.

Thus, the present invention relates to a novel seasoning material comprising as the main component a salt-soluble high-molecular protein (turbid material) which is derived from an esculent animal, plant or fungus and which, although tasteless per se, can afford "steady and sharp" to the taste of foods and drinks when added therewith, and more particularly to a novel seasoning material having as its active ingredient a turbid material principally composed of a salt-soluble protein having a molecular weight of within the range of about 10,000 to 250,000, which has been prepared by treating a water or hot water extract of beef, or the like, with an ultrafilteration membrane, a dialysis membrance or the like to reduce the ionic strength or electro-conductivity of the extract. The present invention further relates to a seasoning and foods and drinks whose flavoring potency or taste has been improved, respectively, with the use of said seasoning material. The seasoning material according to the present invention, when added to the above-mentioned existing processed versions of natural extracts, natural extract substitutes and flavor-seasonings can afford "steady and sharp" to these existing condiments. In other words, by using the seasoning material of the present invention, it is possible to produce the processed versions of natural extracts or natural extract substitutes each having a high quality savor creating potency comparable with natural extracts or basic stock, and also to produce a high quality flavor-seasonings.

The present invention will be described in greater detail below.

The animals, plants and fungi from which the per se tasteless salt-soluble high-molecular protein, i.e., high-molecular protein insoluble in a low ionic strength solution, (turbid material) of this invention, being able to afford "steady and sharp" to the taste of foods and drinks, can be derived or collected are not specifically limited in so far as they are esculent.

Examples of such esculent animals include poultry, livestock, fishes and shellfishes. Not only meats of these animals usually used in food industry, such as beef, pork, chicken, fish and the like, but also bones of these animals such as porker bone, chicken skeleton and the like.

Examples of such esculent plants include seaweeds such as sea tang and vegetables such as white rape, cabbage, celery, and the like.

As examples of such esculent fungi, there can be mentioned, edible mushrooms such as shiitake and Lyophyllum, yeasts and various bacteria which can ferment, amino-acids, nucleic acid and the like.

The turbid material of the present invention can be recovered or collected from the above-mentioned raw materials by suitable means such as water extraction. In carrying out water extraction, it is of course desirable to cut the raw material into pieces of appropriate sizes so that the extraction efficiency will be elevated. The yeasts and fermenting fungi, including bacteria, when used in this invention, are preferably subjected to appropriate treatments such as self digestion, enzymatic processing, mechanical grinding, and the like, before water extraction. Water used for water extraction is not particularly specified, i.e., any water capable of performing desired extraction can be used. It can be cool water, hot water or warm water. In some cases, extraction with other solvent (for example, an organic solvent such as ethanol) may be employed instead of water extraction.

The turbid material composed of a salt-soluble high-molecular protein has a molecular weight of within a range of about 10,000 to 250,000 as measured by gel filtration mode (using, for example, "TOYOPEARL HW-55F" column (3.6 cm⌀×90 cm); eluent: 0.5M NaCl+0.1M phosphate buffer).

In greater detail, the turbid material of the present invention can be produced, for example, in the manner as follows: First, chicken or cattle meat (which may contain bones) or fish or shellfish meat (which may contain shells) is subjected to water extraction. Water used for this extraction may be cold, warm or hot, as described above. The resultant extract is then subjected to a treatment for reducing ionic strength or electroconductivity, such as ultrafiltration, electrodialysis, dialysis or reverse osmosis. A pertinent membrane is of course used for each treatment. As the treatment advances, the ionic strength or electroconductivity of the high-molecular fraction is reduced whereby the turbid material is produced and aggregated within the high-molecular fraction. Lastly, the produced turbid material is separated, as so required, by a suitable method such as centrifugation or freeze-drying.

The turbid material of this invention may also be produced, for example, in the following way: A water or hot water extract of beef is first treated with a centrifuge or a filter to remove the residue, dregs, oils and fats, and the like, and then the extract so treated is contained in a bag made of a commercially available cellulose dialysis membrane and left in tap water overnight to get rid of low-molecular substances and salts, thereby reducing the ionic strength or electroconductivity whereby a turbid material mainly composed of a salt-soluble protein. The turbid material is separated and collected by using a centrifuge or other means. The collected turbid material may be frozen and stored or freeze-dried so that it is ready for use when so desired.

Succulent vegetables, after cut into pieces of appropriate sizes or without being cut, are pressed or squeezed, and the produced juice is subjected to a treatment for reducing the ionic strength or electroconductivity to obtain the turbid material of the present invention. In the case of yeasts and fermenting fungi, they are subjected to such treatments as self digestion, enzymatic processing and mechanical grinding and then separated into solid and juice, and the turbid material of this invention is obtained from the juice. Thus, the turbid material of this invention can be produced from the juice by reducing its ionic strength or electroconductivity.

That the high-molecular protein constituting the turbid material of this invention is salt-soluble is attested by the fact that when the ionic strength or electroconductivity of a solution containing the protein is reduced, the particles of the protein are caused to aggregate as mentioned above. When this material is added to a seasoning or a food or drink for improving its taste, the material is of course left in a dissolved state since a sufficient amount of salt is present in the use environment.

There are no difficulties in giving "steady and sharp" to the savor of the existing seasonings or foods and drinks or toning up such "steady and sharp" by using the novel seasoning material mainly composed of the turbid material. That is, the novel seasoning material has only to be added to an existing seasoning or a food or drink whose taste is to be improved, in the same way as ordinary seasonings are used.

The turbid material mainly composed of the salt-soluble protein of this invention may be added to stock for Japanese cuisine, such as broth of dried bonito, chicken, fish, shellfish, sea tangle, beef, shiitake, or the like, to soup stock for Western cooking, such as broth of beef, chicken, pork, fish, shellfish, or the like, or to stock for Chinese dishes, such as broth of beef, chicken, pork, ham, eyes of scallops, awabi (ormer), shrimp, dried cuttlefish, shiitake, Chinese cabbage (white rape), celery, or the like, to give "steady and sharp" to relish produced by such stocks or enhance their relish-creating potency. Also, as has been mentioned above, by adding the turbid material of this invention to the processed versions of natural extracts or natural extract substitutes such as for example, HVP, HAP or yeast extract which can be utilized as amino-acid mixtures at relatively low cost, or to inexpensive beef extract, it is possible to substantiate or consolidate the general taste and to provide "steady and sharp" while enriching the taste, thus giving higher quality to the condiments when added with the turbid material. The stocks for Japanese, Western and Chinese dishes, HVP, HAP and yeast extract are all included in the existing seasonings which are to be improved in their savor-generating potency according to the present invention.

Further, all-purpose stock seasonings made of sodium glutamate and nucleotide, beef extract-based seasonings, beef consommé-based seasonings, yeast extract-based seasonings, pork extract-based seasonings, chicken extract-based seasonings, crab or shrimp extract-based seasonings, fish or shellfish extract-based seasonings, bonito or dried bonito extract-based seasonings, dried small sardine extract-based seasonings, sea tangle extract-based seasonings, and other seasonings including mieki liquid (hydrolyzate of soybean flake), soy sauce and Worcester sauce are all provided with "steady and sharp" and enhanced in their savor-generating action when the novel seasoning material (turbid material) of the present invention is added thereto. Therefore, all of these seasonings are embraced in the concept of the "existing seasonings", specifically processed versions of natural extracts, natural extract substitutes and flavor-seasonings referred to in the present invention.

The amount of the turbid material to be added is the quantity which produces the effects of the material when used, that is, the quantity which can provide "steady and sharp" to flavor or is effective for uplifting savor. This quantity, although different in its optimal range depending on the type of food or seasoning to which the material is to be added, is usually selected so that the concentration of the material in a seasoning solution would be 0.01 to 0.2% in solid weight. By adding the turbid material of this invention in the above-mentioned amount, it is possible to provide "steady and sharp" which the conventional stocks are unable to give, and to adjust the taste while preventing the taste from becoming flat. In any case, it is easy for those skilled in the art to decide the optimal amount of use for any specific case through simple prior trials.

The turbid material of the present invention, which is principally composed of a high-molecular protein having a strong relish-developing function, can be utilized per se as a seasoning or may be added to various types of processed foods, nourishing foods, medical foods, and the like. The material can also contribute to effective utilization of livestock products and marine resources. There are involved no difficulties in the way of addition; the material may be added in the form as it is or as a saline solution.

BEST MODE FOR CARRYING OUT THE INVENTION

The process for obtaining the turbid material of this invention and the effect of its addition are described below, with reference to some examples. These examples, however, are merely intended to be illustrative only and not to be construed as limiting the scope of the invention.

EXAMPLE 1

6 kg of beef shank was cut into pieces about 5 to 10 cm square and placed in a 30-liter aluminum cylinder pot, together with 8 liters of water. The beef was cooked at 90°–95° C. for about 6 hours. The resulting broth was filtered with the use of a 300-mesh filter cloth to obtain about 5 liters of a hot water extract. The residual fine pieces of beef and other dregs formed were removed from the hot water extract and the latter was refrigerated overnight. The oils and fats which had come up to the surface of the extract solution and the dregs which had been formed during refrigeration were removed with a 60-mesh screen, and then the solution was centrifuged with a Sharples ultracentrifuge (mfd. by Nakamura Denki Seisakusho Co., Ltd.; operated at 15,000 r.p.m.) to remove the fine sediments and suspended solids.

The supernatant which had become brown and transparent after centrifugation was once freeze-dried for the purpose of subjecting it to long-time storage and compositional analysis. The freeze-dried powder was dissolved in water to a concentration of 8 g/dl and the resulting solution was contained in a bag made of a cellulose dialysis membrane and dialyzed by using an ample amount of tap water for a whole day and night. As dialysis progressed, the low-molecular substances and salts were brought out into the solution outside the dialysis membrane. The solution inside the dialysis membrane, namely the high-molecular fraction was lowered in its ionic strength from 0.2 to about 0, and the salt-soluble protein was aggregated to produce the turbid material of the present invention. On the other hand, the electroconductivity was lowered from about 18 mS/cm to around 0.1 mS/cm, and in the course of this lowering of electroconductivity, turbidity began to take place at 7 mS/cm or below. The solution inside the dialysis membrane was centrifuged (at a rate of about 10,000 g, 20 min) whereby the produced turbid material was collected. The collected turbid material was freeze-dried to obtain approximately 1 g of dry powder (solid matter).

This solid matter contained 90% or more protein. The molecular weight of this turbid material was estimated by dissolving the material in a 0.5M saline solution and conducting measurement in the gel filtration mode (using "Toyopearl HW-55F" column). It was found that the molecular weight ranged from 10,000 to 250,000.

The thus obtained turbid material, which is a "steady and sharp" imparting material, was added to portions of a commercial consomme soup in amounts of ratios of 0.01%, 0.03%, 0.05%, 0.1% and 0.2% on the basis of the soup, respectively, and the produced savor was subjected to profile evaluation by a 5-membered panel. As a result, each of the samples to which the turbid material had been added was provided with "steady and sharp" or consolidation in taste, in addition to enhancement of "substance" or depth of taste, without changing the flavor peculiar to the control consomme soup. As for the effect of addition of the material, however, no much differences were seen when the addition ratio was 0.05% or above, and therefore, from economical consideration, addition of the material in a ratio of about 0.1% is supposed sufficient.

EXAMPLE 2

About 3 kg of water was added to about 2 kg of minced round and the mixture was homogenized with a homogenizer "MULTI-BLENDER MILL" (mfd. by Nippon Seiki Seisakusho Co., Ltd.) for two hours and then refrigerated overnight. Then the beef and floating solidified oils and fats were removed from the homogenizate in the same way as in Example 1 and the resulting residual liquid was filtered with a centrifuge equipped with an about 300-mesh filter cloth.

The filtrate was conducted to ultrafiltration (using an ultrafilter membrane to remove material with a molecular weight of less than 10,000) while supplementing tap water, whereby the low-molecular weight substances and salts were removed. During this ultra-filtration treatment, the electroconductivity of the high-molecular weight fraction was reduced from 3.5 mS/cm to 0.4 mS/cm and a turbid material was produced. The turbid material was collected in the same way as in Example 1 and freeze-dried. There was consequently obtained 0.75 g of turbid material as dry solid, viz., a "steady and sharp" imparting material.

The thus obtained turbid material was added to a commercial sold bonito-based liquid stock (base stock) and the change of savor was evaluated by a 5-membered panel as in Example 1 (profile evaluation). As a result, it was confirmed that addition of the material made the savor "steady an sharp" as a whole while preventing the taste from being flat. As for the amount of the material to be added, the savor produced by bonito broth could be significantly improved by addition of the material in an amount of about 0.05% based on the stock.

EXAMPLE 3

About 750 g of flakes of dried bonito (hongarebushi) was added to 15 liters of boiling water and cooked for 60 minutes to prepare 13 liters of a bonito extract. This extract was once freeze-dried for the purpose of long-time storage and compositional analysis.

20 g of the obtained dry powder was dissolved in 200 ml of water and the solution was subjected to reverse osmosis (using a low-pressure loose RO (reverse osmosis) membrane; salt removal rate: 50%) to remove the low-molecular substances and salts. The ionic strength was lowered from 0.2 to about 0. On the other hand, the electroconductivity was reduced from 19 mS/cm to 0.17 mS/cm. The high-molecular fraction was filtered on filter paper and freeze-dried to obtain about 0.11 g of a turbid material as dry powder. To a broth prepared by evaporating the low-molecular fraction (solution outside the dialysis membrane) obtained in Example 1 to a concentration of 2 g/dl the powder was added in an amount of 0.02% on the basis of the broth, whereby the savor of the broth was substantiated and given "steady and sharp".

EXAMPLE 4

A hot water extract of chicken and pig bones cooked in 95° C. water for 7 hours was concentrated under reduced pressure to a solid content of about 20%. To 90 parts by weight of this bone extract was added 10 parts by weight of commercial dextrin and the mixture was stirred and spray dried to prepare a bone extract powder (processed version of natural extract).

A turbid material prepared in the same manner as in Example 1 was added in various amounts to portions of the bone extract, respectively. Each mixture was dissolved in 70° C. water to a solid concentration of 5%. The taste of the thus prepared 5 types of bone soup was evaluated by a five-membered panel. The results are shown in Table 1 below.

TABLE 1

| Soup sample No. | Amount of turbid material added (wt % in solution) | Firmness | Depth & body |
|---|---|---|---|
| 1 (control) | 0 | − | + − |
| 2 | 0.02 | + − | + |
| 3 | 0.04 | + | + + |
| 4 | 0.08 | + + | + + |
| 5 | 0.10 | + + | + + |

−: Not perceived at all.
+ −: Slightly perceived.
+: Perceived certainly but not strongly.
+ +: Perceived strongly.

EXAMPLE 5

20 parts by weight of dried bonito (katsuo-arahonbushi), 30 parts by weight of common salt, 30 parts by weight of lactose and 20 parts by weight of sodium glutamate were pulverized and mixed. The mixture was then subjected to the steps of for moistening, kneading, extrusion granulation and hot air drying to obtain a bonito-flavored seasoning (conventional product). There was also prepared a granular bonito-flavored seasoning in the same way as above except that 5 out of 30 weight parts of lactose was replaced by a turbid material obtained in the same manner as in Example 1 (sample product of the present invention).

The conventional product and the sample product of this invention were each dissolved in 70° C. water, and the relish-generating quality and savor of each of the resulting broths ware evaluated according to a 2-point comparison method by a trained 10-membered panel. As a result, the sample product was significantly preferred in strength and agreeableness of the taste produced, and especially it was judged to have a deeper aftertaste and stronger body. As regards flavor, there was no appreciable distinction between the two.

Industrial Applicability

The novel seasoning material of the present invention is tasteless per se, but when added to the prior-art existing seasonings, i.e., processed versions of natural extracts, natural extract substitutes or flavor-seasonings, can afford "steady and sharp" to the savor produced by them. Thus, it can provide the processed versions of natural extracts, natural extract substitutes and flavor-seasonings having an excellent taste creativeness similar to the natural extracts or basic stocks.

We claim:

1. A method of enhancing the flavor of a food or drink, comprising:
    adding, to a food or drink, a flavor enhancing material,
    wherein said flavor enhancing material comprises protein,
    at least 0.11 g of said protein is soluble in 200 ml of a water solution having an electroconductivity of 19 mS/cm, and
    said flavor enhancing material is tasteless at a concentration which enhances the flavor of said food or drink, and has a molecular weight range of 10,000 to 250,000 by gel filtration.

2. A method of preparing a seasoning, comprising:
    mixing a flavor enhancing material with at least one member selected from the group consisting of a processed version of a natural extract, a natural extract substitute and a flavor-seasoning,
    wherein said flavor enhancing material comprises protein,
    at least 0.11 g of said protein is soluble in 200 ml of a water solution having an electroconductivity of 19 mS/cm, and
    said flavor enhancing material is tasteless at a concentration which enhances the flavor of said food or drink, and has a molecular weight range of 10,000 to 250,000 by gel filtration.

3. The method of claim 1, wherein, after the addition of said flavor enhancing material to said food or drink, the concentration of said flavor enhancing material in said food or drink is at least 0.01 wt %.

4. The method of claim 1, wherein said flavor enhancing material is prepared by a process comprising the step of:
    reducing the ionic strength or electroconductivity of an extract of at least one member selected from the group consisting of meat, fungus, vegetable juice, liquid of self-digested yeast, liquid of self-digested fermenting bacteria, liquid of enzymatically processed yeast, liquid of enzymatically fermenting bacteria, liquid of mechanically ground yeast and liquid of mechanically ground fermenting bacteria.

5. A product produced by the process of claim 1.

6. The method of claim 2, wherein, after mixing said flavor enhancing material with said at least one member, the concentration of said flavor enhancing material in said at least one member is 0.01 to 0.2% in solid weight.

7. The method of claim 2, wherein said flavor enhancing material is prepared by a process comprising the step of:
    reducing the ionic strength or electroconductivity of an extract of at least one member selected from the group consisting of meat, fungus, vegetable juice, liquid of self-digested yeast, liquid of self-digested fermenting bacteria, liquid of enzymatically processed yeast, liquid of enzymatically fermenting bacteria, liquid of mechanically ground yeast and liquid of mechanically ground fermenting bacteria.

8. A product prepared by the process of claim 2.

9. The method of claim 1, wherein said protein is insoluble in a water solution having an electroconductivity of 0.1 mS/cm.

10. The method of claim 2, wherein said protein is insoluble in a water solution having an electroconductivity of 0.1 mS/cm.

11. The method of claim 4, wherein said extract is an extract of meat.

12. The method of claim 7, wherein said extract is an extract of meat.

13. The method of claim 11, wherein said extract is an extract of beef.

14. The method of claim 12, wherein said extract is an extract of beef.

15. The method of claim 4, wherein said reducing of the ionic strength or electroconductivity is accomplished by a means selected from the group consisting of ultrafiltration, electrodialysis, dialysis and reverse osmosis.

16. The method of claim 7, wherein said reducing of the ionic strength or electroconductivity is accomplished by a means selected from the group consisting of ultrafiltration, electrodialysis, dialysis and reverse osmosis.

17. The method of claim 4, wherein said electroconductivity is reduced from at least 3.5 mS/cm to at most 0.4 mS/cm.

18. The method of claim 7, wherein said electroconductivity is reduced from at least 3.5 mS/cm to at most 0.4 mS/cm.

19. The method of claim 4, wherein said ionic strength is reduced to about 0.

20. The method of claim 7, wherein said ionic strength is reduced to about 0.

* * * * *